United States Patent
Kato

(10) Patent No.: US 8,665,474 B2
(45) Date of Patent: Mar. 4, 2014

(54) METHOD, SYSTEM, APPARATUS AND MEDIUM FOR MINIMIZING UNNECESSARY PROCESSING ASSOCIATED WITH CONNECTION/DISCONNECTION OF A SAME HOST

(75) Inventor: Kota Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 13/123,839

(22) PCT Filed: Jan. 27, 2010

(86) PCT No.: PCT/JP2010/051458
§ 371 (c)(1),
(2), (4) Date: Apr. 12, 2011

(87) PCT Pub. No.: WO2010/090195
PCT Pub. Date: Aug. 12, 2010

(65) Prior Publication Data
US 2011/0194147 A1    Aug. 11, 2011

(30) Foreign Application Priority Data
Feb. 9, 2009   (JP) ................. 2009-027357

(51) Int. Cl.
G06F 3/12    (2006.01)
(52) U.S. Cl.
USPC .................. 358/1.15; 358/1.13; 358/1.14
(58) Field of Classification Search
USPC ................................. 358/1.13–1.15
See application file for complete search history.

(56) References Cited

U.S. PATENT DOCUMENTS

| | | | |
|---|---|---|---|
| 7,428,068 B2* | 9/2008 | Kadoi et al. | 358/1.15 |
| 2006/0195552 A1* | 8/2006 | Nampei | 709/218 |
| 2007/0283075 A1* | 12/2007 | Patton | 710/315 |
| 2009/0225354 A1* | 9/2009 | Yonezawa | 358/1.15 |
| 2010/0214611 A1* | 8/2010 | Watanabe | 358/1.15 |
| 2010/0225951 A1* | 9/2010 | Koshigaya | 358/1.14 |
| 2010/0262734 A1* | 10/2010 | Sohn et al. | 710/107 |
| 2010/0271651 A1* | 10/2010 | Kimura | 358/1.14 |

FOREIGN PATENT DOCUMENTS

| | | | |
|---|---|---|---|
| JP | 11-154128 A | 6/1999 |
| JP | 11-327938 A | 11/1999 |
| JP | 2001-014118 A | 1/2001 |
| JP | 2005-174122 | 6/2005 |
| JP | 2005-219343 A | 8/2005 |
| JP | 2007-128352 A | 5/2007 |
| JP | 2007-251851 A | 9/2007 |
| JP | 2008-165413 A | 7/2008 |

* cited by examiner

Primary Examiner — Benny Q Tieu
Assistant Examiner — Quyen V Ngo
(74) Attorney, Agent, or Firm — Fitzpatrick, Cella, Harper & Scinto

(57) ABSTRACT

An image forming apparatus which can avert wasteful processing of disconnection from and reconnection to the same host when a currently-connected host and a host that should be connected next are the same. When a print request is received from one of a plurality of hosts, host information indicative of the host is registered so that an order of print requests can be identified. Connection and disconnection to and from the hosts are carried out according to the host information. Printing is carried out based on print data received from the hosts. When a host as a source of a print request received next after a print request from a currently-connected host is the same as the currently-connected host, print data is received from the currently-connected host, and then print data corresponding to the next print request is received from the currently-connected host without disconnecting from the currently-connected host.

8 Claims, 14 Drawing Sheets

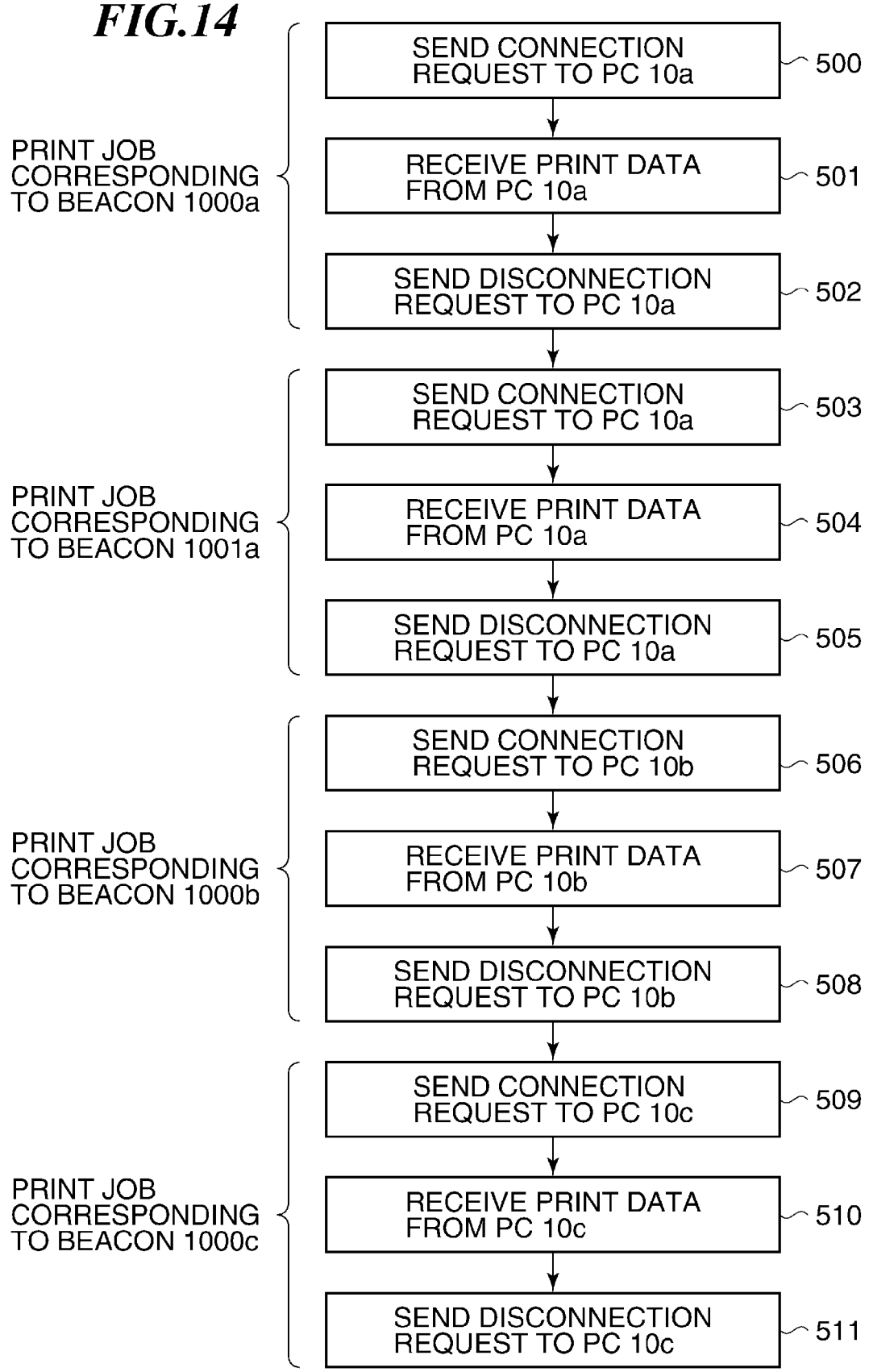

METHOD, SYSTEM, APPARATUS AND MEDIUM FOR MINIMIZING UNNECESSARY PROCESSING ASSOCIATED WITH CONNECTION/DISCONNECTION OF A SAME HOST

TECHNICAL FIELD

The present invention relates to an image forming apparatus, a control method therefor, and a storage medium storing a program for implementing the method.

BACKGROUND ART

As an example of various interfaces for connecting a personal computer (hereinafter referred to as a "PC") and peripherals together, there is known a wireless USB specification (Wireless USB Specification Rev. 1.0) according to which unwired USBs (Universal Serial Buses) are used.

Referring now to FIGS. 10 to 12, a description will be given of a system in which a plurality of PCs share one printer using wireless USBs mentioned above. FIG. 10 is a block diagram schematically showing an arrangement of a system in which a plurality of PCs share one printer using wireless USBs. FIG. 11 is a view schematically showing how commands and print data are sent and received between the PC and the printer connected together using the wireless USBs. FIG. 12 is a diagram schematically showing an arrangement of host information included in a beacon sent form the PC appearing in FIG. 10.

As a system in which a plurality of PCs share one printer using wireless USBs, a system that enables a plurality of PCs 10a to 10c to share one printer 30 as shown in FIG. 10 can be envisaged. The PCs 10a to 10c and the printer 30 have wireless USBs 11a to 11c and 31, respectively.

Here, the printer 30 cannot communicate with the plurality of PCs 10a to 10c via the wireless USBs 11a to 11c and 31 at the same time. This is determined by the wireless USB specification. Therefore, the printer 30 communicates with any one of the PCs 10a to 10c one-on-one.

For example, when print data created by an application of the PC 10a is to be printed by the PC 10a, a user gives a print instruction to a print driver installed in the PC 10a. In response to the print instruction, the printer driver sends a beacon for giving a print request to the printer 30 from the wireless USB 11a as shown in FIG. 11. The beacon is continuously transmitted for a predetermined time period (for example, five seconds). The beacon includes information such as a unique host ID assigned to the PC 10a and a unique device ID assigned to the printer 30 as shown in FIG. 12.

Upon receiving the beacon via the wireless USB 31, the printer 30 stars one-on-one connection processing for establishing a wireless communication with the PC 10a. First, the printer 30 obtains a device ID from the received beacon, and checks whether or not the device ID and a device ID held in the printer 30 correspond to each other. Here, when both of these device IDs do not correspond to each other, the printer 30 determines that the received beacon is not a beacon for the printer 30, and discards the received beacon.

When both of these device IDs correspond to each other, the printer 30 obtains a host ID from the received beacon, and checks whether or not the host ID corresponds to one of host IDs held in the printer 30. When both of these host IDs do not corresponds to each other, the printer 30 determines that the received beacon is not a beacon for the printer 30, and discards the received beacon.

The host IDs registered in the printer 30 are host IDs that are registered by initial connection processing (association) on the wireless USB 31 required at the time of installation of the printer 30. In this example, host IDs of the respective PCs 10a to 10c are registered in the printer 30. The initial connection processing is carried out so that the PCs 10a to 10c and the printer 30 can share CC (Connection Context: comprised of a host ID, a device ID, and a connection key), and has the following three phases, identification, authentication, and permission.

When it is determined in this way that the host ID and the device ID held in the printer 30 correspond to the host ID and the device ID, respectively, received from the PC 10a, the printer 30 sends a connection request to the PC 10a via the wireless USB 31.

The PC 10a having received the connection request from the printer 30 complies with the connection request, and sends spooled print data to the printer 30 via the wireless USB 11a. Upon completion of the transmission of the print data, the PC 10a sends a disconnection request so as to avoid occupation of the printer 30. The disconnection request can be sent from both the PC 10a and the printer 30.

In the above described way, a one-on-one wireless connection using wireless USBs is established between the printer 30 and the PC 10a, and a wireless communication is carried out between them. However, while wirelessly connecting to one PC, the printer 30 can receive beacons (print requests) from other PCs but cannot wirelessly connect to the other PCs. Thus, the printer 30 cannot sequentially accept print requests from the PCs 10a to 10c in order and process print data. That is, the printer 30 cannot print jobs from the PCs 10a to 10c in order.

To solve this, a system has been proposed which receives a beacon from a host, lists host information included in the beacon and holds the same, and sends a connection request to the host based on the listed host information (see PTL (Patent Literature) 1).

A description will be given of the proposed system with reference to FIGS. 10, 13, and 14. FIG. 13 is a diagram showing a host list held by the printer. FIG. 14 is a diagram showing the sequence of processing carried out by the printer in accordance with the host list.

For example, the PC 10a sends a beacon 1000a (print request) via the wireless USB 11a as shown in FIG. 10. Subsequently, the same PC 10a sends a beacon 1001a (print request) via the wireless USB 11a. Further subsequently, the PC 10b sends a beacon 1000b (print request), and the PC 10c sends a beacon 1000c (print request).

In this case, the printer 30 sequentially receives the beacons 1000a, 1001a from the PC 10a, the beacon 1000b from the PC 10b, and the beacon 1000c from the PC 10c.

As shown in FIG. 13, the printer 30 registers on a host list 40 host IDs included in the beacons 1000a, 1001a, 1000b, and 1000c, respectively, in the order in which they were received. The host list 40 is comprised of a write column 42 to which registration numbers 41 are assigned. The registration numbers 41 are indicative of the order in which beacons are received by the printer 30, and the order in which connection requests are given to the PCs 10a to 10c. Also, host IDs as transmission sources of received beacons are written in the write column 42.

As shown in FIG. 14, the printer 30 refers to the host list 40, and first, sends a connection request to the PC 10a registered as the registration No. 1 on the host list 40 (500). Then, when a wireless connection with the PC 10a is established, the printer 30 receives print data sent from the PC 10a (501), and upon completion of the reception of the print data, the printer 30 sends a disconnection request to the PC 10a (502).

Then, the printer 30 sends a connection request to, receives print data from, and sends a disconnection request to the PC 10a registered as the registration No. 2 on the host list 40 (503 to 505). After that, a connection request is sent to, print data is received from, and a disconnection request is sent to the PC 10b in order (506 to 508), and a connection request is sent to, print data is received from, and a disconnection request is sent to the PC 10c in order (509 to 511).

As described above, the printer 30 registers on the host list 40 host IDs of the PCs 10a to 10c in the order in which beacons (print requests) were received from the plurality of PCs 10a to 10c, so that print jobs requested by the PCs 10a to 10c are processed in the order in which the print jobs were requested.

Moreover, as an example of systems in which a plurality of PCs share one printer, there is a system in which a plurality of PCs and one printer are connected together via a network such as a LAN. For this system, there has been proposed a technique for the printer to list and manage print requests from the plurality of PCs, and process print data requested to be printed by the PCs in the order in which print requests were given (see PTL 2).

CITATION LIST

Patent Literature

{PTL 1} Japanese Laid-Open Patent Publication (Kokai) No. 2007-251851
{PTL 2} Japanese Laid-Open Patent Publication (Kokai) No. 2007-128352

SUMMARY OF INVENTION

Technical Problem

However, in the above described system using wireless USBs, when job requests are given in sequence from the same host (PC) to a device (printer), the device must temporarily terminate a wireless connection with the same host, and then establishes a wireless connection again to the same host. This corresponds to the disconnection request to the PC 10a (502), and the connection request to the PC 10a (503).

As described above, when a currently-connected host and a host that should be connected next are the same, wasteful processing in which a wireless connection with the same host is temporarily terminated, and then a wireless connection with the same host is established again is carried out, and hence time is wasted.

Moreover, in a system in which a plurality of PCs share one printer via a LAN, when print job requests are given in sequence from the same PC to the printer as described above, disconnection from the same printer and reconnection with the same printer after the disconnection must be carried out.

The present invention provides an image forming apparatus, a control method therefor, and a storage medium storing a program for implementing the method, which make it possible to avert wasteful processing in which disconnection from and reconnection to the same host when a currently-connected host and a host that should be connected next are the same.

Solution to Problem

Accordingly, in a first aspect of the present invention, there is provided an image forming apparatus capable of communicating with a plurality of host computers, comprising a registration unit that, when receiving a print request from any one of the plurality of host computers, registers host information indicative of the host computer as a source of the request so that an order of print requests can be identified, a control unit that carries out connection and disconnection to and from each of the host computers as sources of print requests according to the host information registered in the registration unit, a printing unit that receives print data from the host computers connected by the control unit, and carries out printing processing based on the received print data, wherein when it is determined based on the host information registered in the registration unit that a host computer as a source of a print request received next after a print request from a currently-connected host computer is the same as the currently-connected host computer, the control unit provides control to receive print data from the currently-connected host computer, and then receive print data corresponding to the next print request from the currently-connected host computer without terminating the connection with the currently-connected host computer.

Accordingly, in a second aspect of the present invention, there is provided a control method for an image forming apparatus capable of communicating with a plurality of host computers, comprising a registration step of, when receiving a print request from any one of the plurality of host computers, registering in a registration unit host information indicative of the host computer as a source of the request so that an order of print requests can be identified, a control step of carrying out connection and disconnection to and from each of the host computers as sources of print requests according to the host information registered in the registration unit, a printing step of receiving print data from the host computers connected in the control step, and carrying out printing processing based on the received print data, wherein in the control step, when it is determined based on the host information registered in the registration unit that a host computer as a source of a print request received next after a print request from a currently-connected host computer is the same as the currently-connected host computer, control is provided to receive print data from the currently-connected host computer, and then receive print data corresponding to the next print request from the currently-connected host computer without terminating the connection with the currently-connected host computer.

Accordingly, in a third aspect of the present invention, there is provided a storage medium storing a program for causing a computer to implement a control method for an image forming apparatus.

Advantageous Effects of Invention

According to the present invention, when a currently-connected host and a host that should be connected next are the same, wasteful processing in which disconnection from and reconnection to the same host can be averted.

The features and advantages of the invention will become more apparent from the following detailed description taken in conjunction with the accompanying drawings.

BRIEF DESCRIPTION OF DRAWINGS

FIG. 14 is a diagram showing the sequence of processing carried out by the printer in accordance with the host list.

DESCRIPTION OF EMBODIMENTS

The present invention will now be described in detail with reference to the drawings showing preferred embodiments thereof.

Figure 1:
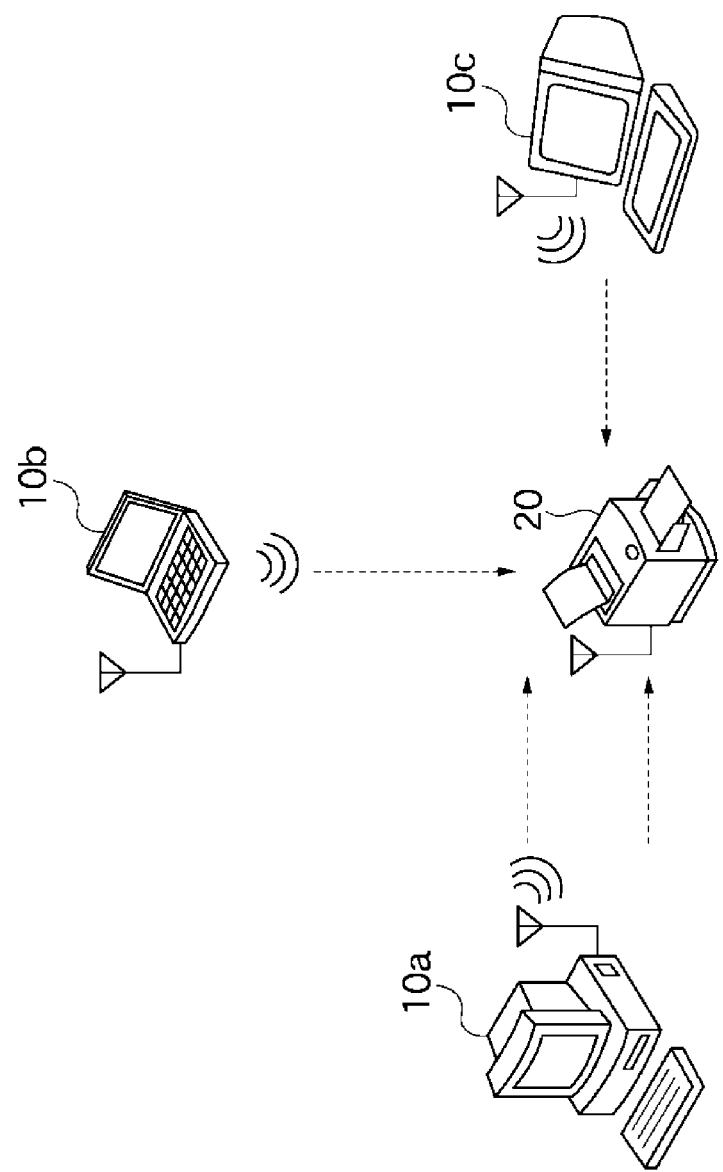
FIG. 1 is a view schematically showing an arrangement of a system in which one or more PCs (host computers) share a printer (image forming apparatus) according to a first embodiment of the present invention using wireless USBs.
Figure 2:
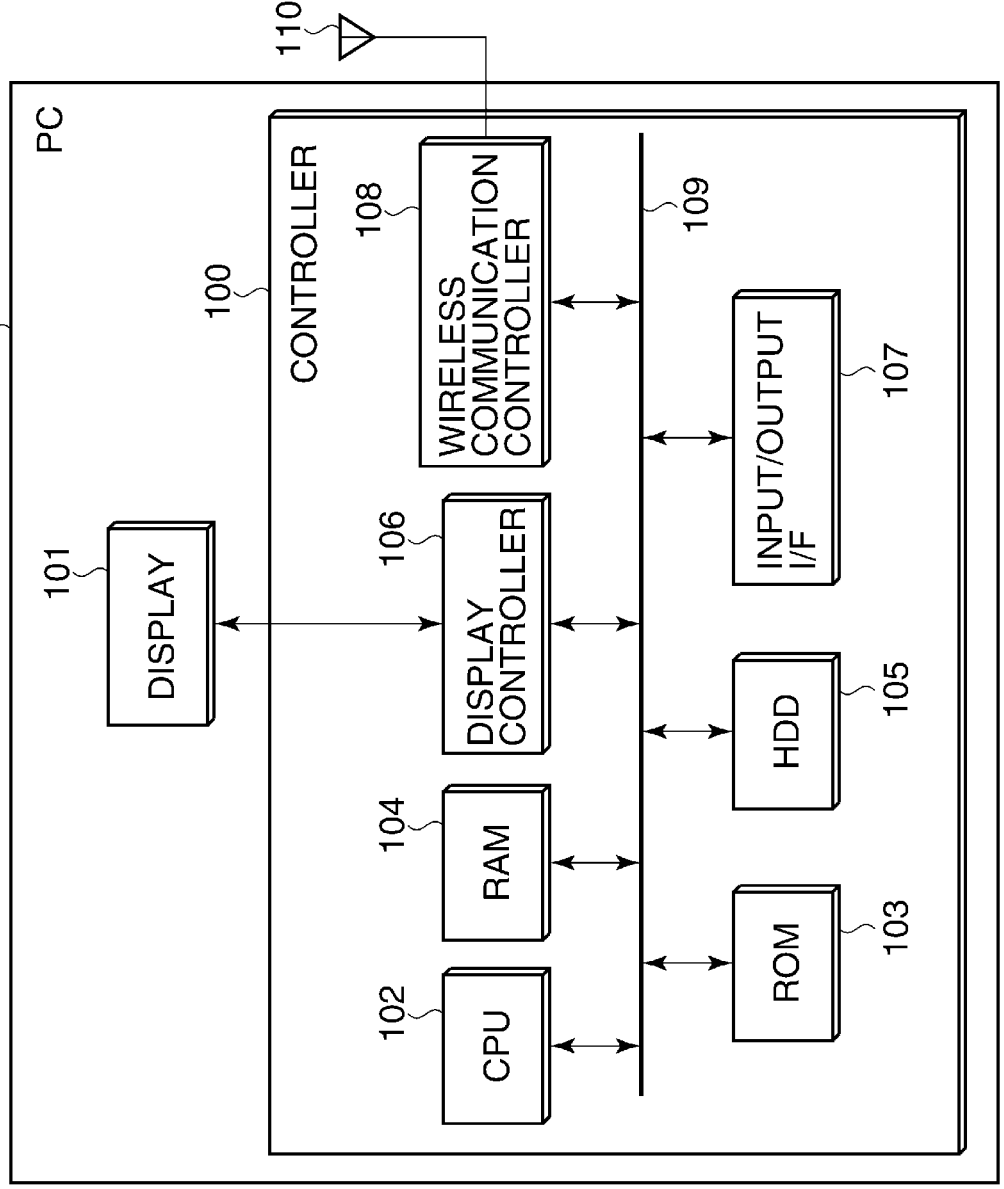
FIG. 2 is a block diagram schematically showing an arrangement of the PC appearing in FIG. 1.
Figure 3:
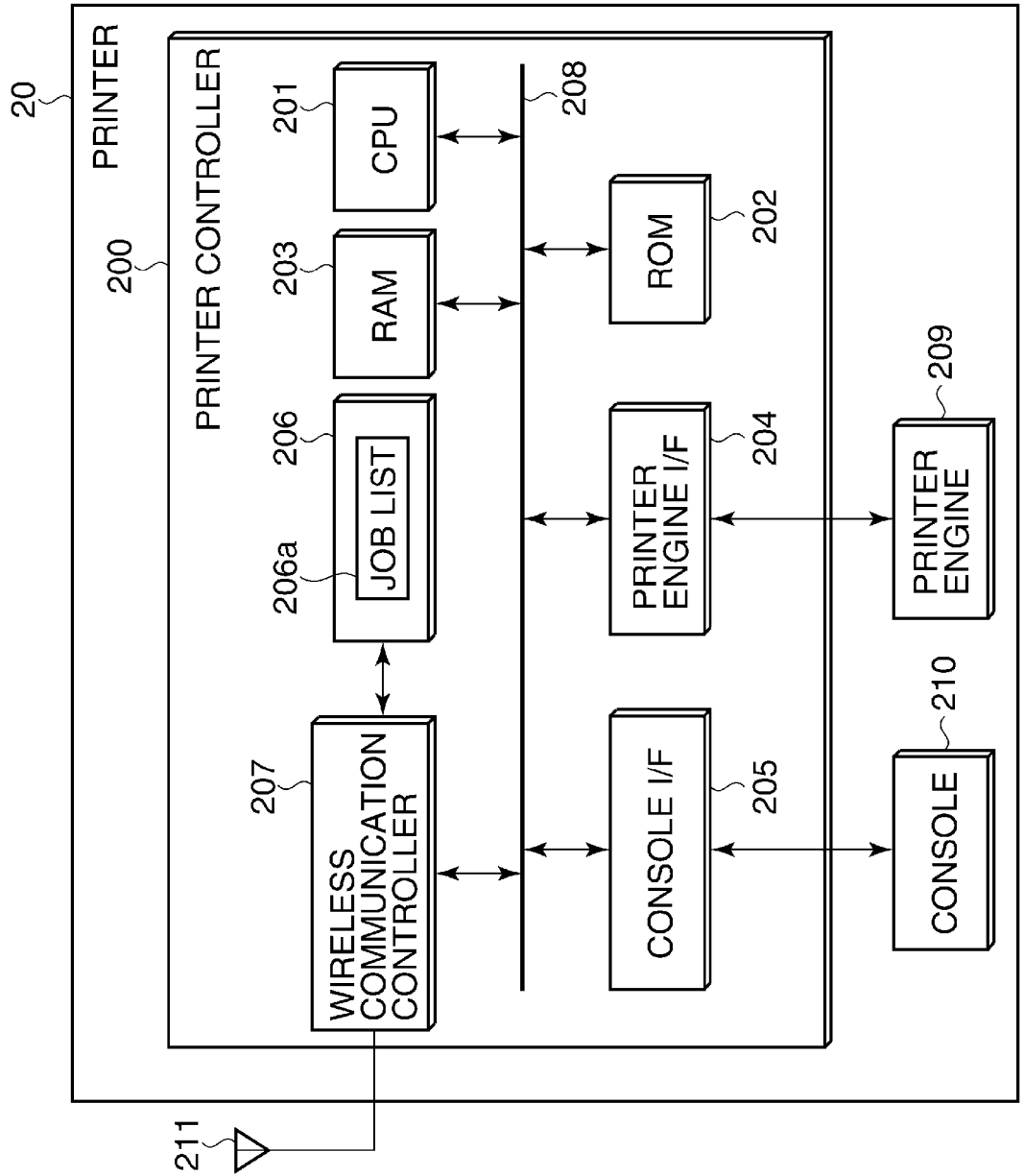
FIG. 3 is a block diagram schematically showing an arrangement of the printer appearing in FIG. 1.

FIG. 1 is a view schematically showing an arrangement of a system in which one or more PCs (host computers) share a printer (image forming apparatus) according to a first embodiment of the present invention using wireless USBs. FIG. 2 is a block diagram schematically showing an arrangement of the PC appearing in FIG. 1. FIG. 3 is a block diagram schematically showing an arrangement of the printer appearing in FIG. 1.

In the present embodiment, a system is configured in which one or more PCs 10a to 10c (host computers) can share a printer 20 (image forming apparatus) using wireless USBs as shown in FIG. 1.

Here, the PCs 10a to 10c have a controller 100 as shown in FIG. 2. The controller 100 has a CPU 102, a ROM 103, a RAM 104, an HDD (hard disk drive) 105, a display controller 106, an input/output I/F (interface) 107, and a wireless communication controller 108. These blocks 102 to 108 are connected together via a system bus 109.

The CPU 102 boots an OS (operating system) in accordance with a boot program stored in the ROM 103 and a program stored in the HDD 105 so that the system is operable by a user. Then, the CPU 102 executes the corresponding software to execute various kinds of processing based on input operations by the user. Here, the software includes a printer driver for the printer 20. The printer driver configures various settings such as selection of the type and size of paper to be printed and enlargement and reduction during printing, and issues a print request (processing request) to the printer 20 upon receiving a print instruction from the user.

The RAM 104 provides a work area for the CPU 102 to operate, and provides a storage area for temporarily storing various data such as print data. The HDD 105 stores various data such as OS programs, various kinds of software, and print data.

The display controller 106 provides control to display image data on a display 101. The input/output I/F 107 has, for example, a USB (a wired USB) and an IEEE 1394 as interfaces for connecting to a keyboard, a mouse (not shown), and so on. The input/output I/F (interface) 107 also has a network I/F for connecting with a network such as a LAN.

The wireless communication controller 108 provides an interface for wirelessly connecting to an external device, that is, the printer 20 for communication in accordance with wireless USB standards via an antenna 110. Here, upon receiving a print request from the printer driver mentioned above, the wireless communication controller 108 sends a beacon including unique host IDs assigned to the PCs 10a to 10c and a unique device ID of the printer 20 via the antenna 110. The beacon is transmitted for a predetermined time period (for example, five seconds) at predetermined intervals.

The printer 20 has a printer controller 200 as shown in FIG. 3. The printer controller 200 has a CPU 201, a ROM 202, a RAM 203, a printer engine I/F 204, a console I/F 205, and a wireless communication controller 207. These blocks 201 to 205 and 207 are connected together via a system bus 208.

The CPU 201 controls the overall operation of the apparatus and executes various kinds of processing in accordance with programs stored in the ROM 202. The RAM 203 provides a work area for the CPU 201 to operate, and provides a storage area for temporarily storing various data such as print data.

The printer engine I/F 204 is an interface for connecting with a printer engine 209, and controls communication between the printer engine 209 and the CPU 201. The printer engine I/F 204 carries out synchronous-to-asynchronous conversion of image data. Here, the printer engine 209 is comprised of a printer using a predetermined print method such as an electrophotographic method or an inkjet method, and carries out printing processing based on image data, that is, printing of image data in accordance with an instruction from the CPU 201. The print method of the printer engine 209 is not limited.

The console I/F 205 is an interface for inputting and outputting data to and from a console 210. The console 210 is provided with hardware keys for inputting information for configuring various settings such as mode settings, and a display unit for displaying various kinds of information such as information indicative of the status of the apparatus. Information input via the console 210 is sent to the CPU 201 via the console I/F 205. The console I/F 205 sends information created by the CPU 201 to the console 210, and the console 210 displays the information on the display unit.

The wireless communication controller 207 provides an interface for wirelessly connecting to external devices, that is, the PCs 10a to 10c for communication in accordance with wireless USB standards via an antenna 211. Here, the wireless communication controller 108 is ready at all times (including a time period from connection to a PC to disconnection from the same) to receive beacons from the PCs 10a to 10c.

Figure 13:
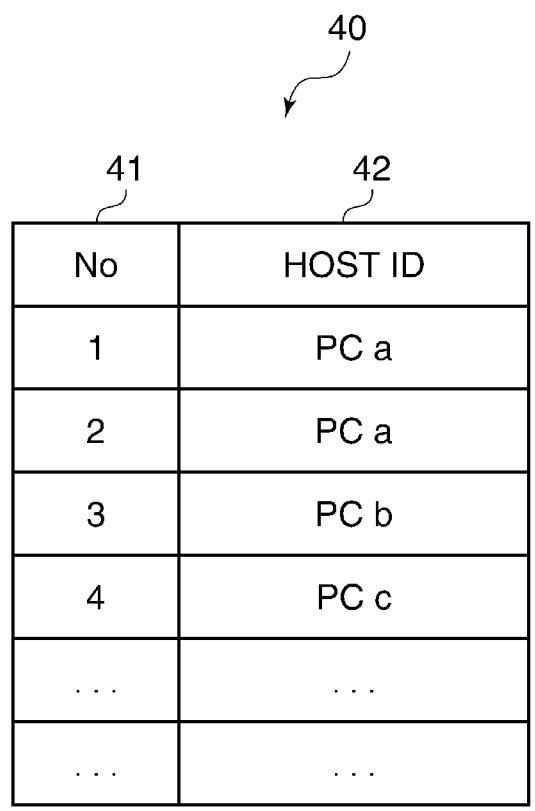
FIG. 13 is a diagram showing a host list held by the printer.

A job list holding unit 206 is connected to the communication controller 207. The job list holding unit 206 is comprised of a memory such as a RAM, and holds a job list 206a for managing a sequence of processing on print data (print jobs) requested to be printed by the PCs 10a to 10c. In the job list 206a, host IDs included in beacons received from the PCs 10a to 10c by the wireless communication controller 207 are registered as host information. The host IDs are registered in the job list 206a in the order in which the host IDs (beacons) were received. Namely, the host IDs are registered such that the order in which the host IDs were received can be identified. The structure of the job list 206a is the same as that of the list appearing in FIG. 13. The registration of the job list 206a is carried out by the wireless communication controller 207. Specifically, the wireless communication controller 207 monitors whether a beacon has been received from the PCs 10a to 10c, and upon receiving a beacon from the PCs 10a to 10c, registers a host ID included in the beacon on the job list 206a.

In accordance with host IDs registered in the job list 206a and the order in which they are registered, the wireless communication controller 207 carries out connection to and disconnection from the corresponding PC (PC as a source of a print request).

For example, when the wireless communication controller 207 receives a beacon from any of the PCs 10a to 10c in a state in which there is no host ID registered in the job list 206a, a host ID included in the beacon is registered first, that is, as the registration No. 1 on the job list 206a. Thus, when a host ID is registered as at least the registration No. 1 on the job list 206a, the wireless communication controller 207 sends a connection request to a PC with the host ID registered as the registration No. 1 via the antenna 211. Then, when a wireless connection is established between the printer 20 and the PC, transmission of print data form the PC is started, and the printer 20 starts receiving the print data from the PC.

Also, the wireless communication controller 207 receives a beacon from the same PC as the above PC or another PC with the host ID registered as the registration No. 1, a host ID included in the beacon is registered in the job list 206a. Here, in a case where the beacon is received from the same PC as the currently-connected PC (the PC with the registration No. 1 host ID), it is determined that the beacon was sent upon the elapse of at least a predetermined time period after the transmission of the previous beacon, and is different from the previous beacon. Then, the host ID in the received beacon is registered second, that is, as the registration No. 2 following the registration No. 1 on the job list 206a. Namely, in this case, the same ID is registered as the registration No. 1 and the registration No. 2.

On the other hand, when the received beacon is one from another PC, a host ID in the beacon is different from the host ID from the previous beacon, and is thus registered second (registration No. 2) on the job list 206a.

In the above described way, the host IDs included in the received beacons are registered in the job list 206a in the order in which the beacons were received. The processing for the registration of host IDs is carried out in a task other than control to carry out connection to and disconnection from the corresponding PC in accordance with the job list 206a.

Moreover, the wireless communication controller 207 updates the job list 206a so as to delete the host ID with the registration No. 1 (first) on the job list 206a and raise the registration numbers of the registration No. 2 and subsequent (second and later) host IDs to higher registration numbers. The timing of the update of the job list 206a differs according to whether or not the currently-connected PC and a PC that should be connected next are the same, and the details thereof will be described later.

Figure 4:
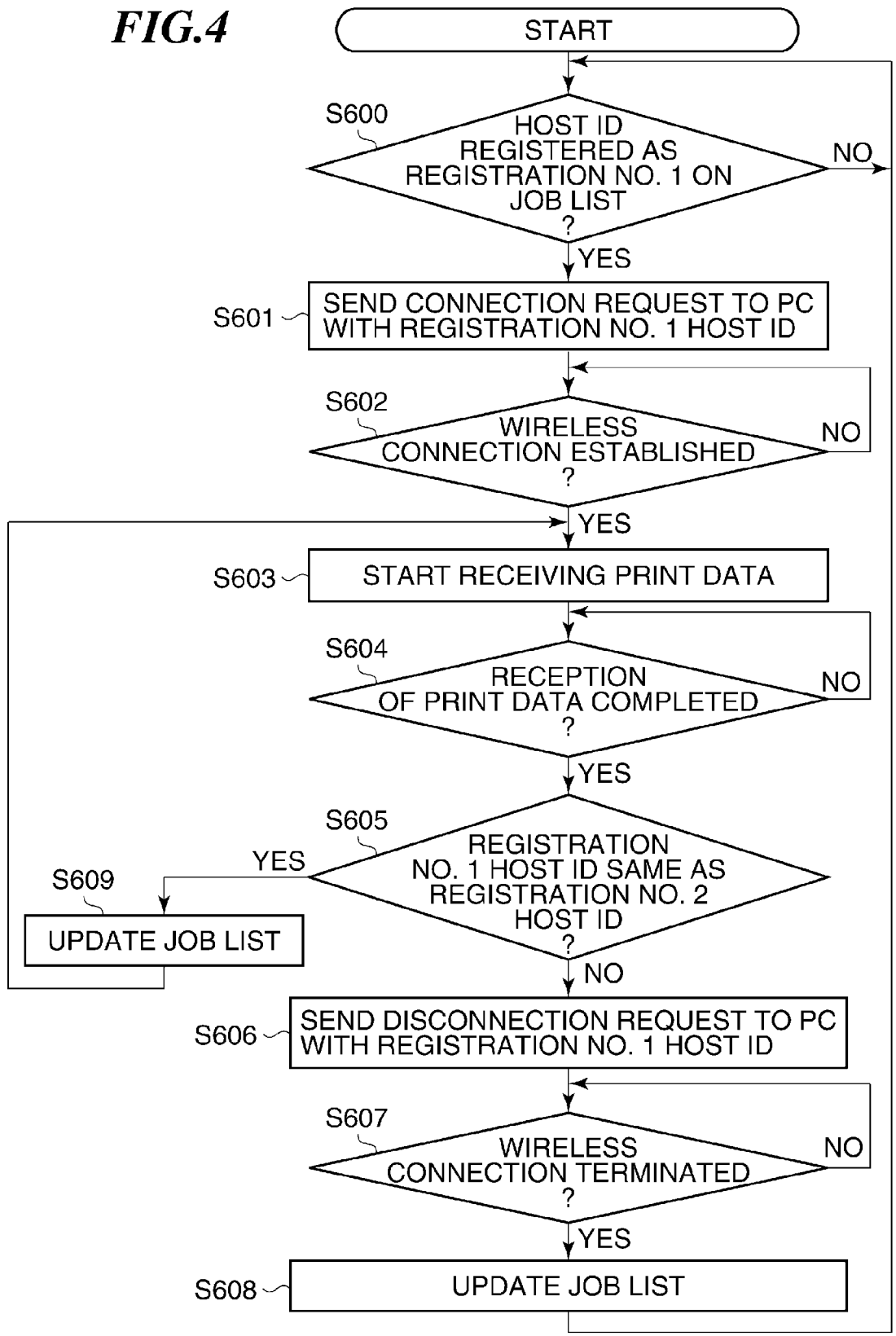
FIG. 4 is a flowchart showing procedures of connection and disconnection to and from a plurality of PCs carried out by a wireless communication controller appearing in FIG. 3 in accordance with a job list.
Figure 5:
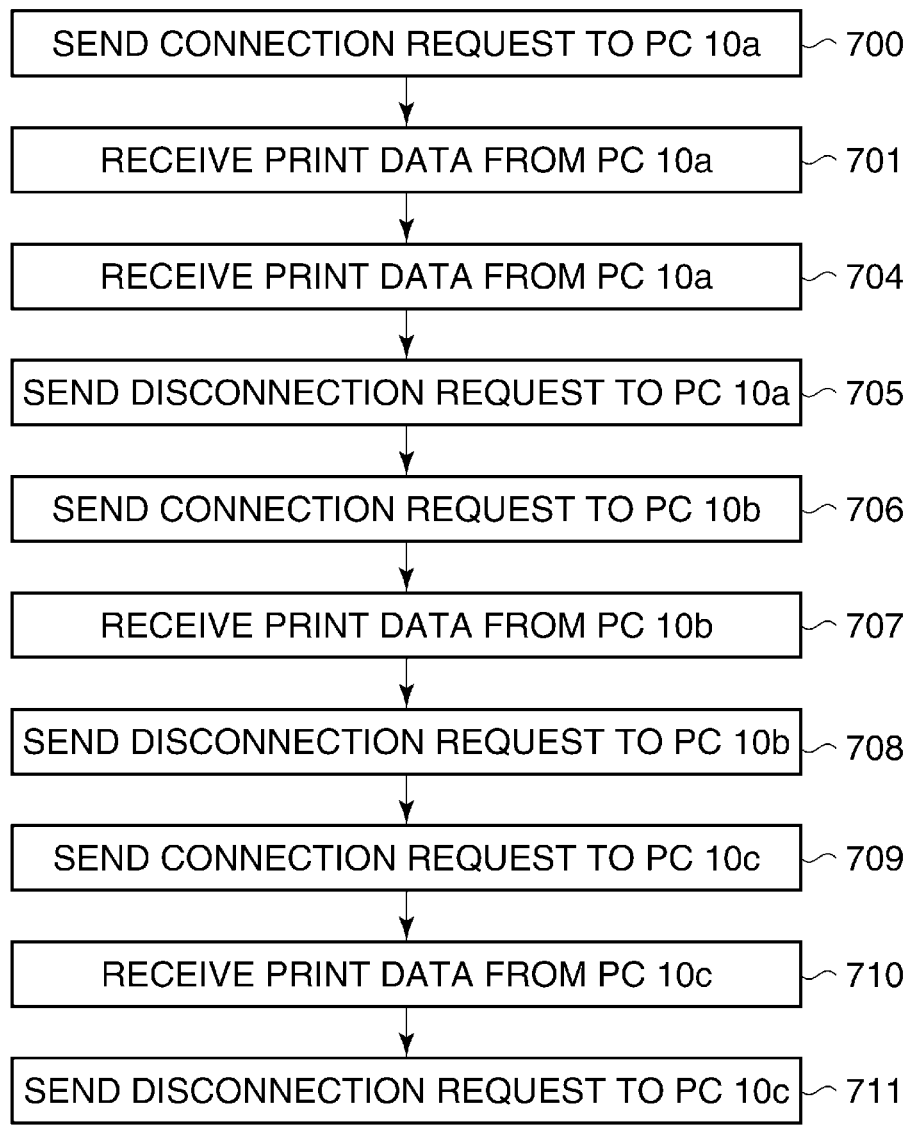
FIG. 5 is a diagram showing the sequence of processing carried out by the printer appearing in FIG. 1 in accordance with the job list.

Referring next to FIGS. 4 and 5, a description will be given of connection and disconnection to and from the PCs 10a to 10c carried out by the wireless communication controller 207 in accordance with the job list 206a. FIG. 4 is a flowchart showing procedures of connection and disconnection to and from the PCs 10a to 10c carried out by the wireless communication controller 207 appearing in FIG. 3 in accordance with the job list 206a. FIG. 5 is a diagram showing a sequence of processing carried out by the printer 20 appearing in FIG. 1 in accordance with the job list 206a.

Here, description of processing in which the wireless communication controller 207 registers host IDs included beacons received from the PCs 10a to 10c is omitted.

First, as shown in FIG. 4, the wireless communication controller 207 determines whether or not a host ID is registered as the registration No. 1 on the job list 206a (step S600). Here, when a host ID is registered as the registration No. 1 on the job list 206a, the wireless communication controller 207 sends a connection request to a PC with the host ID registered as the registration No. 1 on the job list 206a (step S601). Then, the wireless communication controller 207 waits for establishment of a wireless connection with the wireless communication controller 108 of the PC with the host ID (step S602).

When the wireless connection with the wireless communication controller 108 of the PC with the host ID is established, the wireless communication controller 207 starts receiving print data sent from the PC with the host ID (step S603). Here, under the control of the CPU 201, the received print data is temporarily held in the RAM 203, and sent to the printer engine 209 via the printer engine I/F 204. Then, the wireless communication controller 207 waits for completion of reception of the print data from the PC with the host ID (step S604).

Upon completion of reception of the print data, the wireless communication controller 207 determines whether or not the host ID registered as the registration No. 1 on the job list 206a is the same as a host ID registered as the registration No. 2 on the job list 206a (step S605). The case where the host ID registered as the registration No. 1 on the job list 206a is the same as the host ID registered as the registration No. 2 on the job list 206a means the case where the currently-connected PC and a PC that should be connected next are the same. In this case, the wireless communication controller 207 updates the job list 206a (step S609). Here, the host ID registered as the registration No. 1 (first) on the job list 206a is deleted, and the registration numbers of the registration No. 2 and subsequent (second and later) host IDs are raised to higher registration numbers. Specifically, the registration numbers are raised so that the registration number No. 2 host ID can be the registration No. 1, and the registration No. 3 host ID can be the registration No. 2. Then, the wireless communication controller 207 maintains the connection with the currently-connected PC without disconnecting (sending a disconnection request to) from the currently-connected PC, and starts receiving next print data from the currently-connected PC (step S603).

In the step S605, the case where it is determined that the host ID registered as the registration No. 1 on the job list 206a is not the same as the host ID registered as the registration No. 2 on the job list 206a means the case where the currently-connected PC and a PC that should be connected next are different. In this case, the wireless communication controller 207 sends a disconnection request to the currently-connected PC (the PC with the registration No. 1 host ID) (step S606). Then, the wireless communication controller 207 waits for termination of the wireless connection with the currently-connected PC (step S607).

When the wireless connection with the currently-connected PC is terminated, the wireless communication controller 207 updates the job list 206a (step S608). Here, the host ID registered as the registration No. 1 on the job list 206a is deleted, and the registration numbers of the registration No. 2 and subsequent host IDs are raised to higher registration numbers. Then, the wireless communication controller 207 returns to the step S600.

For example, assume that on the job list 206a, the host ID of the PC 10a is registered as the registration No. 1, the host ID of the PC 10a is registered as the registration No. 2, the host ID of the PC 10b is registered as the registration No. 3, and the host ID of the PC 10c is registered as the registration No. 4.

In this case, first, the printer 20 sends a connection request to the PC 10a (700). Then, when a wireless connection is established between the printer 20 and the PC 10a, the printer 20 receives print data sent from the PC 10a (701).

Upon completion of the reception of the print data sent from the PC 10a, the printer 20 maintains the wireless connection with the PC 10a without sending a disconnection request to the PC 10a because a PC that should be connected next is the same as the currently-connected PC. Then, the printer 20 receives next print data sent from the PC 10a (704). Upon completion of the reception of the print data sent from the PC 10a, the printer 20 sends a disconnection request to the PC 10a because a PC that should be connected next is different from the currently-connected PC (705). As a result, the wireless connection between the printer 20 and the PC 10a is terminated.

When the wireless connection between the printer 20 and the PC 10a is terminated, the printer 20 sends a connection request to the PC 10b that should be connected next (706). Then, when a wireless connection is established between the printer 20 and the PC 10b, the printer 20 receives print data sent from the PC 10b (707). Upon completion of the reception of the print data sent from the PC 10b, the printer 20 sends a disconnection request to the PC 10b because a PC that should be connected next is different from the currently-connected PC (708). As a result, the wireless connection between the printer 20 and the PC 10b is terminated.

When the wireless connection between the printer 20 and the PC 10b is terminated, the printer 20 sends a connection request to the PC 10c that should be connected next, receives print data sent from the PC 10c, and sends a disconnection request to the PC 10c (709 to 711).

As described above, when a PC that should be connected next is the same as a currently-connected PC, processing for disconnecting from the currently-connected PC and connecting to the PC that should be connected next can be omitted. Namely, wasteful processing for disconnecting from and reconnecting to the same PC can be averted.

Figure 6:
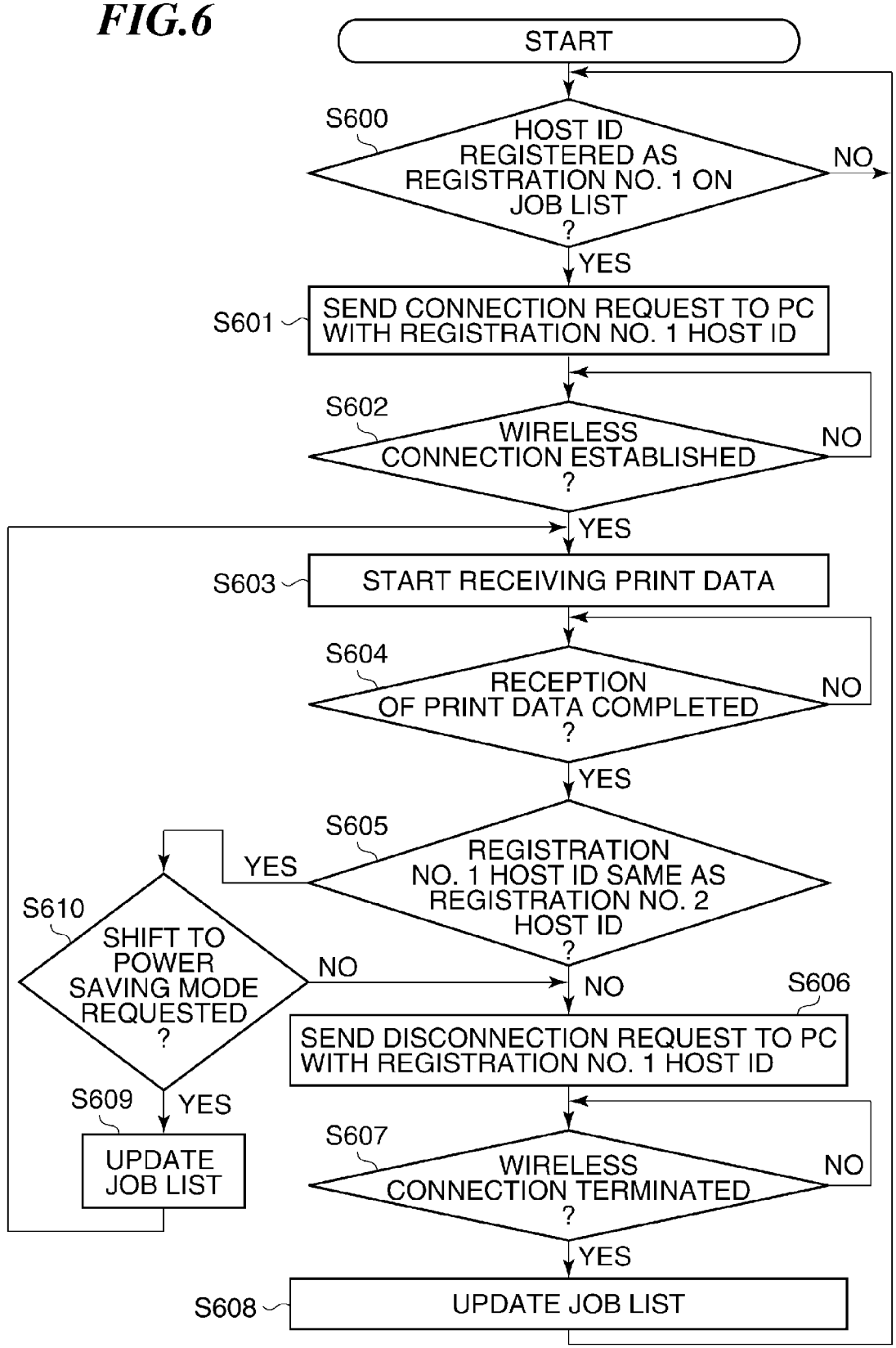
FIG. 6 is a flowchart showing the procedure of connection and disconnection to and from a PC carried out by a printer according to a second embodiment of the present invention in accordance with a job list.

Next, a description will be given of a second embodiment of the present invention with reference to FIG. 6. FIG. 6 is a flowchart showing procedures of connection and disconnection to and from a PC carried out by a printer according to the second embodiment of the present invention in accordance with a job list. Here, the arrangement of the present embodiment is the same as that of the first embodiment described above, and description thereof is omitted.

In the first embodiment described above, when a PC that should be connected next is the same as a currently-connected PC, a connection with the currently-connected PC is maintained without disconnecting from the currently-connected PC and connecting to the PC that should be connected next after reception of print data from the currently-connected PC is completed.

In the present embodiment, only in a case where a PC that should be connected next is the same as a currently-connected PC, and a shift (switching) from a normal power mode to a power saving mode is requested, a connection with the currently-connected PC is maintained without disconnecting from the currently-connected PC. In this case, a connection with a PC that should be connected next is not established.

Namely, the present embodiment is realized by adding step S610 to the flowchart of FIG. 4 as shown in FIG. 6.

Specifically, when the registration No. 1 host ID and the registration No. 2 host ID on the job list 206a are the same (step S605), the wireless communication controller 207 determines whether or not a shift to the power saving mode has been requested (step S610). A request for shifting to the power saving mode is issued by the CPU 201. Here, when the shift to the power saving mode has been requested, the wireless communication controller 207 updates the job list 206a (step S609). Then, the wireless communication controller 207 maintains the connection with the currently-connected PC without disconnecting from the currently-connected PC, and starts receiving next print data from the currently-connected PC (step S603).

When it is determined in the step S610 that a shift to the power saving mode has not been requested, the wireless communication controller 207 sends a disconnection request to the currently-connected PC (step S606). Then, the wireless communication controller 207 waits for the wireless connection with the currently-connected PC to be terminated (step S607).

As described above, in a case where a PC that should be connected next is the same as a currently-connected PC, and a shift to the power saving mode is requested, a connection with the currently-connected PC is maintained without disconnecting from the currently-connected PC. As a result, processing for disconnecting from the currently-connected PC and connecting to the PC that should be connected next may be omitted, and an interruption of processing accompanying the shift to the power saving mode may be averted.

Figure 7:
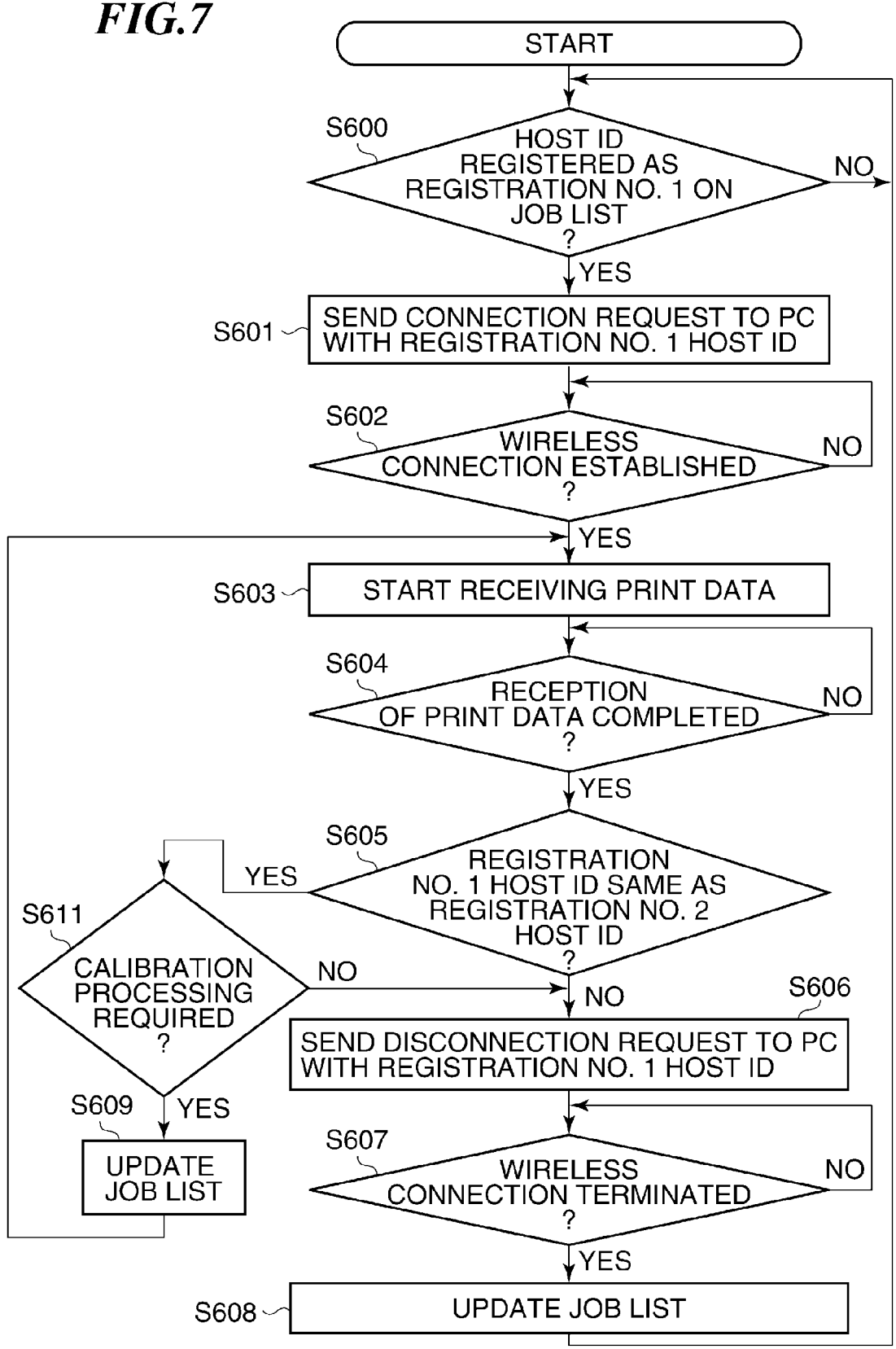
FIG. 7 is a flowchart showing procedures of connection and disconnection to and from a PC carried out by a printer according to a third embodiment of the present invention in accordance with a job list.

Next, a description will be given of a third embodiment of the present invention with reference to FIG. 7. FIG. 7 is a flowchart showing procedures of connection and disconnection to and from a PC carried out by a printer according to the third embodiment of the present invention in accordance with a job list. Here, the arrangement of the present embodiment is the same as that of the first embodiment described above, and description thereof is omitted.

The printer 20 of the present embodiment is a printer using a printing method requiring calibration processing as the printer engine 209. Only when it is determined that a currently-connected PC and a PC that should be connected next are the same, and execution of calibration processing is required, the wireless communication controller 207 maintains the connection with the currently-connected PC without disconnecting from the currently-connected PC. In this point, the present embodiment differs from the first embodiment described above.

That is, the present embodiment is realized by adding step S611 to the flowchart of FIG. 4 as shown in FIG. 4.

Specifically, when the registration No. 1 host ID and the registration No. 2 host ID on the job list 206a are the same (step S605), the wireless communication controller 207 determines whether or not execution of calibration processing is required (step S611). Whether or not execution of calibration processing is required is determined by the CPU 201. Here, when it is determined that execution of calibration processing is required, the wireless communication controller 207 updates the job list 206a (step S609). Then, the wireless communication controller 207 maintains the connection with the currently-connected PC without disconnecting from the currently-connected PC, and starts receiving next print data from the currently-connected PC (step S603).

When it is determined in the step S611 that execution of calibration processing is not required, the wireless communication controller 207 sends a disconnection request to the currently-connected PC (step S606). Then, the wireless communication controller 207 waits for the wireless connection with the currently-connected PC to be terminated (step S607).

As described above, in a case where it is determined that a PC that should be connected next is the same as a currently-connected PC, and execution of calibration processing is required, a connection with the currently-connected PC is maintained without disconnecting from the currently-connected PC and executing calibration processing. As a result, the printer 20 can receive next print data form the currently-connected PC without executing calibration processing. Also, printouts of sequentially-received print data can be prevented from differing in tinge.

Figure 8:
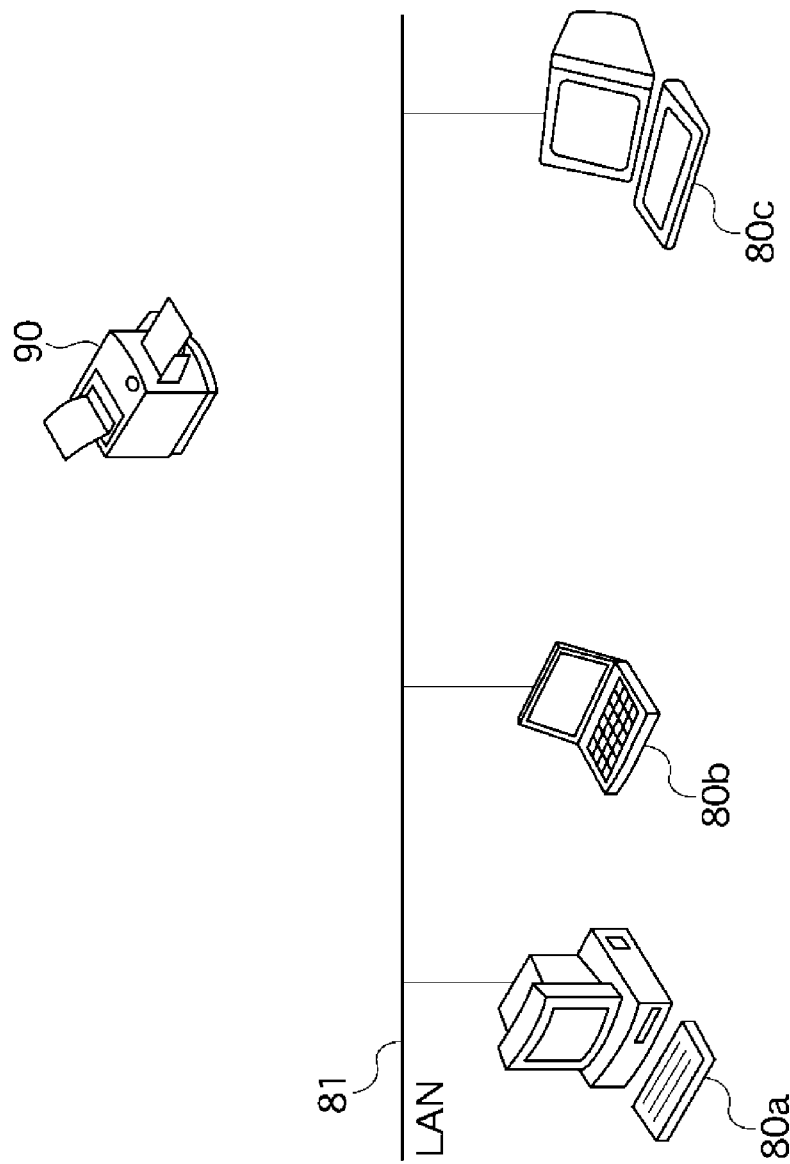
FIG. 8 is a view schematically showing an arrangement of a system in which a printer according to a fourth embodiment of the present invention is shared by one or more PCs.
Figure 9:
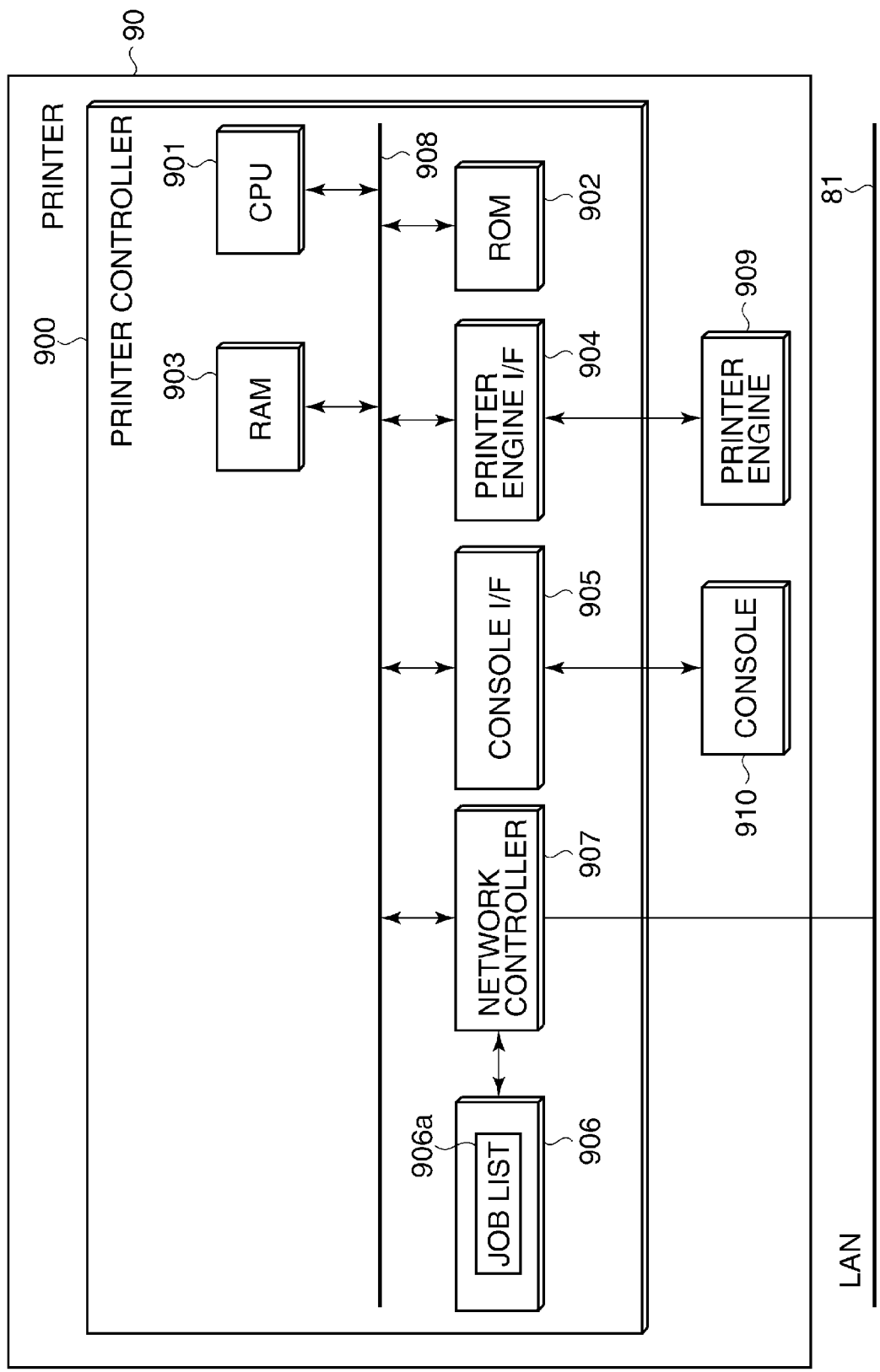
FIG. 9 is a block diagram schematically showing an arrangement of the printer appearing in FIG. 8.
Figure 10:
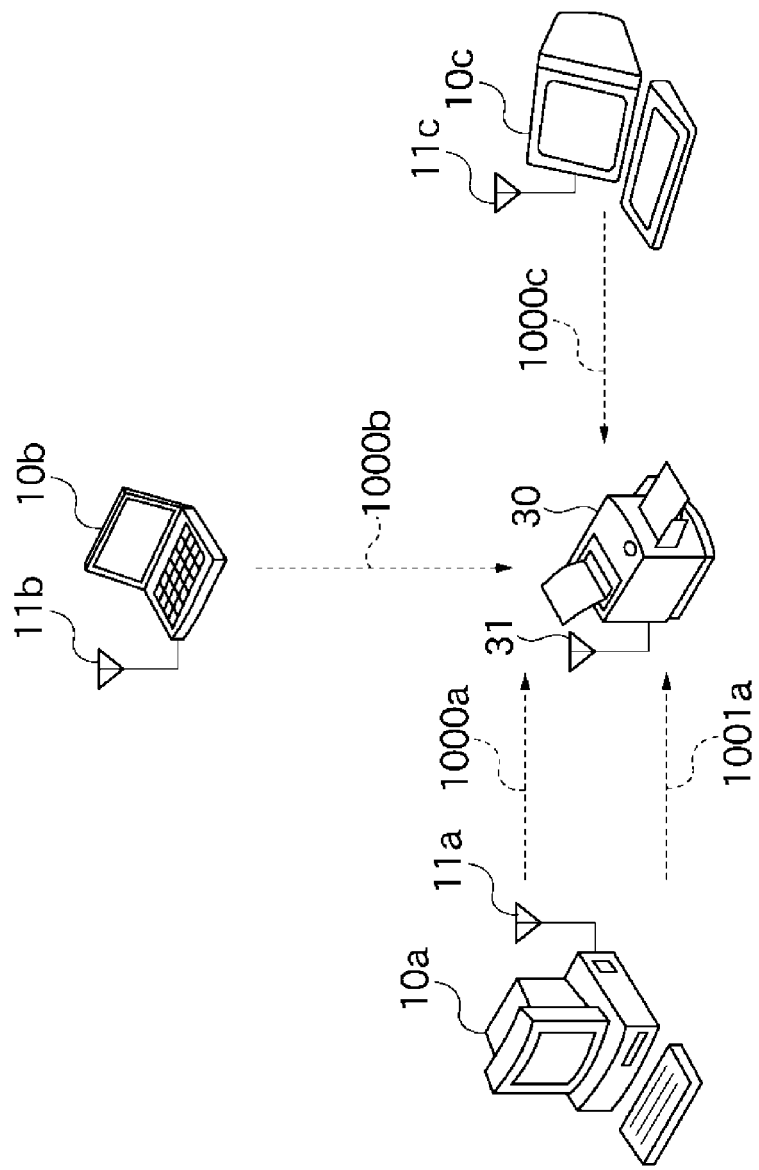
FIG. 10 is a block diagram schematically showing an arrangement of a system in which a plurality of PCs share one printer using wireless USBs.
Figure 11:
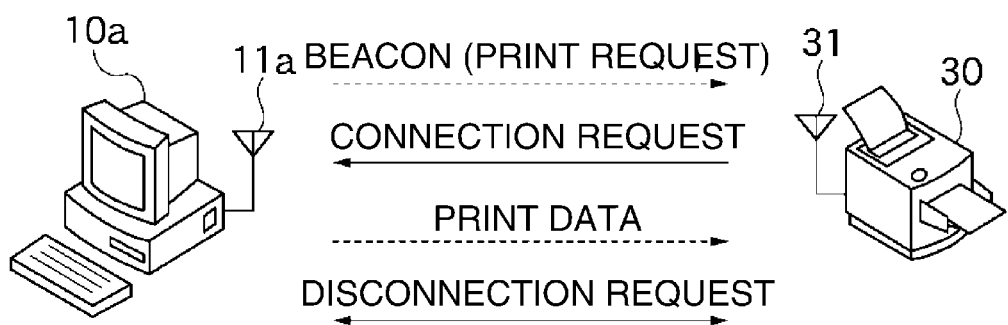
FIG. 11 is a view schematically showing how commands and print data are sent and received between the PC and the printer connected together using the wireless USBs.
Figure 12:
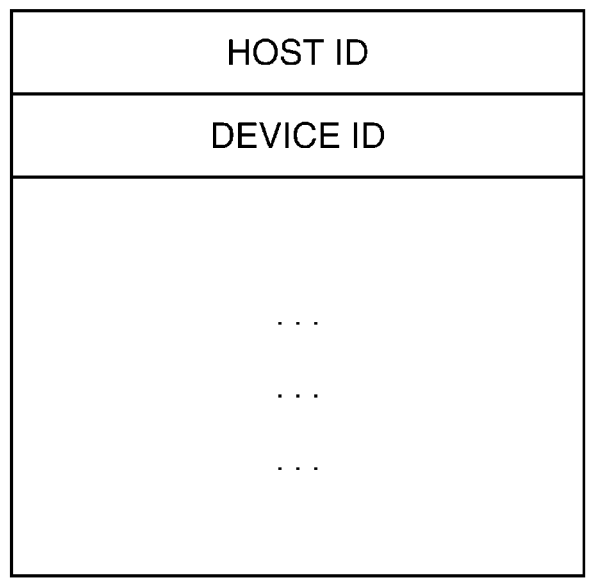
FIG. 12 is a diagram schematically showing an arrangement of host information included in a beacon sent form the PC appearing in FIG. 10.

Next, a description will be given of a fourth embodiment of the present invention with reference to FIGS. 8 and 9. FIG. 8 is a view schematically showing an arrangement of a system in which a printer according to the fourth embodiment of the present invention is shared by one or more PCs. FIG. 9 is a block diagram schematically showing an arrangement of the printer appearing in FIG. 8.

The present embodiment differs from the first embodiment described above in that one or more PCs 80a to 80c can share a printer 90 via a LAN 81 (wired network).

As shown in FIG. 9, the printer 90 has a printer controller 900. The printer controller 900 has a CPU 901, a ROM 902, a RAM 903, a printer engine I/F 904, a console I/F 905, and a network controller 907. These blocks 901 to 905 and 907 are connected together via a system bus 908. A printer engine 909 is connected to the printer engine I/F 904, and a console 910 is connected to the console I/F 905.

The network controller 907 provides an interface for connecting to and disconnecting from the corresponding PC via the LAN 81 by referring to a job list 906a held in a job list holding unit 906. In the job list 906a, host IDs included in print requests are registered in the job list 906a in the order in which they were received from the PCs 80a to 80c by the network controller 907 via the LAN 81. The structure of the job list 906a is the same as that of the list appearing in FIG. 13. The control provides by the network controller 907 to connect to and disconnect from the corresponding PC is the same as that of the first embodiment described above, and description thereof is omitted.

The first to fourth embodiments described above are based on the case where it is determined whether or not a PC indicated by a host ID registered first on the host list 40 is the same as a PC indicated by a host ID registered second on the host list 40. However, there may be an additional arrangement for carrying out the following processing.

Specifically, when a PC indicated by a host ID registered first on the host list 40 and a PC indicated by a host ID registered second on the host list 40 are different, it is determined whether or not a host ID indicative of the same PC as the PC indicated by the host ID registered first. Then, when a host ID indicative of the same PC as the PC indicated by the host ID registered first is registered Nth (N is an integer of 3 or greater) on the host list 40, the Nth host ID may be raised to the second.

By carrying out this processing, reception of print data corresponding to the first host ID and reception of print data corresponding to the Nth host ID can be carried out in succession. That is, unnecessary connection and disconnection processing carried out between a printer and a PC may be further omitted, and a printing environment with enhanced processing efficiency can be provided.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 10a to 10c, 80a to 80c PC
20, 90 Printer
201 CPU
206, 906 Job list holding unit
206a, 906a Job list
207 Wireless communication controller
209, 909 Printer engine
211 Antenna
907 Network controller

The invention claimed is:

1. An image forming apparatus capable of communicating with a plurality of host computers, comprising:
a registration unit that, when receiving a print request from any one of the plurality of host computers, registers host information indicative of the host computer as a source of the request so that an order of print requests can be identified;
a control unit that carries out connection and disconnection to and from each of the host computers as sources of print requests according to the host information registered in said registration unit;
a printing unit that receives print data from the host computers connected by said control unit, and carries out printing processing based on the received print data,
wherein when it is determined based on the host information registered in said registration unit that a host computer as a source of a print request received next after a print request from a currently-connected host computer is the same as the currently-connected host computer, said control unit provides control to receive print data from the currently-connected host computer, and then receive print data corresponding to the next print request from the currently-connected host computer without terminating the connection with the currently-connected host computer.

2. An image forming apparatus as claimed in claim 1, which is capable of communicating with the plurality of host computers using a wireless USB.

3. An image forming apparatus as claimed in claim 1, which is capable of communicating with the plurality of host computers via a wired network.

4. An image forming apparatus as claimed in claim 1, wherein when a host computer as a source of a print request received next after a print request from a currently-connected host computer is different from the currently-connected host computer, and host information corresponding to another print request from the currently-connected host computer is registered in said registration unit, said control unit provides control to receive print data from the currently-connected host computer, and then receive print data corresponding to the other print request from the host computer without terminating the connection with the host computer.

5. An image forming apparatus as claimed in claim 1, further comprising a switching unit that switches between a normal power mode and a power saving mode, wherein when a host computer as a source of a print request received next after a print request from a currently-connected host computer is the same as the currently-connected host computer, and said switching unit requests switching from the normal power mode to the power saving mode, said control unit provides control to receive print data from the currently-connected host computer, and then receive print data corresponding to the next print request from the host computer without terminating the connection with the host computer, and on the other hand, when a host computer as a source of a print request received next after a print request from a currently-connected host computer is the same as the currently-connected host computer, but said switching unit does not request switching from the normal power mode to the power saving mode, said control unit provides control to receive print data from the currently-connected host computer, and then disconnect from the currently-connected host computer to connect to the host computer as the source of the print request received next.

6. An image forming apparatus as claimed in claim 1, further comprising a determination unit that determines whether calibration processing on said printing unit is required, wherein when a host computer as a source of a print request received next after a print request from a currently-connected host computer is the same as the currently-connected host computer, and said determination unit determines that the calibration processing is required, said control unit provides control to receive print data from the currently-connected host computer, and then receive print data corresponding to the next print request from the host computer without terminating the connection with the host computer, and on the other hand, when a host computer as a source of a print request received next after a print request from a currently-connected host computer is the same as the currently-connected host computer, but said determination unit determines that the calibration processing is unnecessary, said control unit provides control to receive print data from the currently-connected host computer, and then disconnect from the currently-connected host computer to connect to the host computer as the source of the print request received next.

7. A control method for an image forming apparatus capable of communicating with a plurality of host computers, comprising:
    a registration step of, when receiving a print request from any one of the plurality of host computers, registering in a registration unit host information indicative of the host computer as a source of the request so that an order of print requests can be identified;
    a control step of carrying out connection and disconnection to and from each of the host computers as sources of print requests according to the host information registered in the registration unit;
    a printing step of receiving print data from the host computers connected in said control step, and carrying out printing processing based on the received print data,
    wherein in said control step, when it is determined based on the host information registered in the registration unit that a host computer as a source of a print request received next after a print request from a currently-connected host computer is the same as the currently-connected host computer, control is provided to receive print data from the currently-connected host computer, and then receive print data corresponding to the next print request from the currently-connected host computer without terminating the connection with the currently-connected host computer.

8. A non-transitory storage medium storing a program for causing a computer to implement a control method for an image forming apparatus as claimed in claim 7.

* * * * *